United States Patent
Shibuya

(10) Patent No.: US 8,955,063 B2
(45) Date of Patent: Feb. 10, 2015

(54) TERMINAL DEVICE AUTHENTICATION METHOD, TERMINAL DEVICE AND PROGRAM

(75) Inventor: Atsushi Shibuya, Tokyo (JP)

(73) Assignee: NEC Corporation, Tokyo (JP)

( * ) Notice: Subject to any disclaimer, the term of this patent is extended or adjusted under 35 U.S.C. 154(b) by 622 days.

(21) Appl. No.: 12/674,217

(22) PCT Filed: Sep. 3, 2008

(86) PCT No.: PCT/JP2008/002417
§ 371 (c)(1),
(2), (4) Date: Feb. 19, 2010

(87) PCT Pub. No.: WO2009/034696
PCT Pub. Date: Mar. 19, 2009

(65) Prior Publication Data
US 2011/0231909 A1   Sep. 22, 2011

(30) Foreign Application Priority Data
Sep. 10, 2007   (JP) ................................. 2007-234320

(51) Int. Cl.
*G06F 15/16*   (2006.01)
*G06F 21/62*   (2013.01)
(Continued)

(52) U.S. Cl.
CPC ............. *H04M 1/673* (2013.01); *G06F 21/629* (2013.01); *H04M 2250/52* (2013.01); *H04W 12/06* (2013.01); *G06F 21/74* (2013.01); *G06F 21/31* (2013.01)
USPC .................................... 726/5; 726/2; 713/186

(58) Field of Classification Search
CPC .... G06F 21/31; G06F 21/6209; H04M 1/673; H04M 2250/52; H04M 1/72577; H04M 1/72522
USPC ............................ 726/2, 5; 455/411; 713/186
See application file for complete search history.

(56) References Cited

U.S. PATENT DOCUMENTS

| | | | |
|---|---|---|---|
| 2005/0212654 A1* | 9/2005 | Yoda | 340/5.53 |
| 2006/0105745 A1 | 5/2006 | Frank | |
| 2007/0024698 A1* | 2/2007 | Engstrom et al. | 348/14.01 |
| 2007/0174868 A1 | 7/2007 | Hitaka | |

FOREIGN PATENT DOCUMENTS

| | | | |
|---|---|---|---|
| JP | 2004080080 A | | 3/2004 |
| JP | 2005-079996 | * | 3/2005 |

(Continued)

OTHER PUBLICATIONS

Chinsese Office Action for CN200880106348.1 issued Aug. 31, 2011.

(Continued)

*Primary Examiner* — Baotran N To
(74) *Attorney, Agent, or Firm* — Sughrue Mion, PLLC

(57) ABSTRACT

Disclosed is an authentication method for a terminal device having an authentication function. The authentication method for a terminal device which performs authentication when a security lock is released so as to operate a security-locked function includes comparing a plurality of authentication information used for the authentication with a plurality of authentication keys corresponding to the plurality of authentication information input in accordance with a function operation request so as to perform authentication, and when the authentication is successful, releasing the security lock so as to operate the function. The plurality of authentication information and the plurality of authentication keys respectively include at least one image.

22 Claims, 9 Drawing Sheets

(51) Int. Cl.
*H04M 1/673* (2006.01)
*G06F 21/74* (2013.01)
*G06F 21/31* (2013.01)
*H04W 12/06* (2009.01)

(56) References Cited

FOREIGN PATENT DOCUMENTS

| JP | 2005079996 A | 3/2005 |
| JP | 2007004723 A | 1/2007 |
| JP | 2007199984 A | 8/2007 |
| WO | 2007/091162 A1 | 8/2007 |

OTHER PUBLICATIONS

International Search Report for PCT/JP2008/002417 mailed Dec. 16, 2008.

The Extended European Search Report for EP Application No. 08830441.5 dated on Dec. 4, 2013.

* cited by examiner

FIG. 3

| DATA FOLDER | AUTHENTICATION TYPE | AUTHENTICATION INFORMATION (SECURITY DATA) |
|---|---|---|
| STILL IMAGE | PERSONAL IDENTIFICATION NUMBER + STILL IMAGE AUTHENTICATION (FACE) | 1234 + STILL IMAGE 1 |
| ADDRESS BOOK | STILL IMAGE AUTHENTICATION (FACE) + PERSONAL IDENTIFICATION NUMBER | STILL IMAGE 1 + 1234 |
| SCHEDULE | STILL IMAGE AUTHENTICATION (FACE) + STILL IMAGE AUTHENTICATION (OBJECT) | STILL IMAGE 1 + STILL IMAGE 2 |
| MAIL | PERSONAL IDENTIFICATION NUMBER + STILL IMAGE AUTHENTICATION (STORED IMAGE) | 1234 + STILL IMAGE 3 |
| MOTION IMAGE | NONE | NONE |
| ......... | ......... | ......... |

FIG. 4

| INDIVIDUAL DATA | AUTHENTICATION TYPE | AUTHENTICATION INFORMATION (SECURITY DATA) |
|---|---|---|
| STILL IMAGE DATA 1 | STILL IMAGE AUTHENTICATION + STILL IMAGE AUTHENTICATION | STILL IMAGE 1 + STILL IMAGE 3 |
| MAIL DATA 3 | PERSONAL IDENTIFICATION NUMBER + STILL IMAGE AUTHENTICATION | 1234 + STILL IMAGE 4 |
| SCHEDULE 5 | STILL IMAGE AUTHENTICATION + 2 PERSONAL IDENTIFICATION NUMBER | STILL IMAGE 2 + 9876 + 1234 |
| ADDRESS BOOK 21 | PERSONAL IDENTIFICATION NUMBER + STILL IMAGE AUTHENTICATION | 1929 + STILL IMAGE 5 |
| MOTION IMAGE 2 | NONE | NONE |
| ...... | ...... | ...... |

FIG. 5

| FUNCTION | AUTHENTICATION TYPE | AUTHENTICATION INFORMATION (SECURITY DATA) |
|---|---|---|
| CAMERA | NONE | NONE |
| MAILER | PERSONAL IDENTIFICATION NUMBER + STILL IMAGE AUTHENTICATION | 9876 + STILL IMAGE 4 |
| BROWSER | STILL IMAGE AUTHENTICATION + STILL IMAGE AUTHENTICATION | STILL IMAGE 3 + STILL IMAGE 4 |
| SCHEDULER | STILL IMAGE AUTHENTICATION + STILL IMAGE AUTHENTICATION | STILL IMAGE 4 + STILL IMAGE 3 |
| ELECTRONIC PAYMENT | 3 STILL IMAGE AUTHENTICATION | STILL IMAGE 1 + STILL IMAGE 2 + STILL IMAGE 3 |
| ... | ... | ... |

TERMINAL DEVICE AUTHENTICATION METHOD, TERMINAL DEVICE AND PROGRAM

TECHNICAL FIELD

The present invention relates to a terminal device, and in particular, to an authentication method for use in image authentication of a terminal device, a terminal device, and a program.

BACKGROUND ART

In recent years, in a small terminal device, such as a mobile phone or the like, information leakage of terminal data and the like due to loss or misplacement is increasing, so security countermeasures for information stored in the terminal device have become important.

As the related art of the invention, a technique is known for taking a security countermeasure regarding a terminal device, for example, authentication (knowledge authentication) based on knowledge information, such as a personal identification number or a password, or face authentication, or the like for protecting data stored in the terminal device.

Patent Document 1 describes a security system capable of preventing unauthorized use by a malicious third person. In this security system, connection between a mobile phone and a cradle is detected, the characteristic points of authentication image data recorded in advance are compared with the characteristic points of image data captured by the camera of the mobile phone, and when both are identical, predetermined processing, such as charging of the mobile phone or the like, is performed.

[Patent Document 1] Japanese Unexamined Patent Publication No. 2007-4723

DISCLOSURE OF THE INVENTION

As described above, authentication functions, such as knowledge authentication, face authentication, and the like, are generally known as the security countermeasures in a terminal device, such as a mobile phone or the like. However, such authentication functions relate to setting and releasing for security-locking the mobile phone (mobile device). Accordingly, if security is released, all functions are available, and unauthorized use by a third person becomes possible.

The security system described in Patent Document 1 is to prevent unauthorized use by a third person in relation to predetermined processing when the mobile phone is connected to the cradle, not to prevent unauthorized use in relation to respective functions of the mobile phone. For this reason, it is impossible to prevent unauthorized use of the third person in relation to the respective functions, and the security property is insufficient.

OBJECT

It is an object of the invention to provide an authentication method for a terminal device, a terminal device, and a program capable of improving a security property in using the functions of the terminal device.

According to the invention, there is provided an authentication method for a terminal device which performs authentication when a security lock is released so as to operate a security-locked function. The authentication method includes comparing a plurality of authentication information used for the authentication with a plurality of authentication keys corresponding to the plurality of authentication information input in accordance with a function operation request so as to perform authentication, and when the authentication is successful, releasing the security lock so as to operate the function. The plurality of authentication information and the plurality of authentication keys respectively include at least one image.

According to the invention, there is provided a terminal device that performs authentication when a security lock is released so as to operate a security-locked function. The terminal device includes a storage unit storing a plurality of authentication information used for the authentication, an input request unit requesting the input of a plurality of authentication keys corresponding to the plurality of authentication information in accordance with a function operation request, an authentication unit comparing the plurality of input authentication keys with the plurality of authentication information so as to perform authentication, and an activation unit releasing the security lock so as to operate the function when the authentication is successful. The plurality of authentication information and the plurality of authentication keys respectively include at least one image.

According to the invention, there is provided a program for controlling a terminal device which performs authentication when a security lock is released so as to operate a security-locked function. The program includes requesting the input of a plurality of authentication keys corresponding to a plurality of authentication information used for the authentication in accordance with a function operation request, comparing the plurality of input authentication keys with the plurality of authentication information so as to perform authentication, and when the authentication is successful, releasing the security lock so as to operate the function. The plurality of authentication information and the plurality of authentication keys respectively include at least one image.

According to the invention, a plurality of authentication information and a plurality of authentication keys including at least one image can be set relative to the activation of functions of the terminal device, so the level of security in relation to the relevant function is improved.

BRIEF DESCRIPTION OF THE DRAWINGS

The above and other objects, advantages and features of the invention will be more apparent from the following description of certain preferred embodiments taken in conjunction with the accompanying drawings.

FIG. 3 is a diagram showing examples of an authentication type and authentication information when a function subject to a security lock is in units of a data folder.

FIG. 4 is a diagram showing examples of an authentication type and authentication information when a function subject to a security lock is a data file.

FIG. 5 is a diagram showing examples of an authentication type and authentication information when a function subject to a security lock is an application program.

BEST MODE FOR CARRYING OUT THE INVENTION

Figure 1:
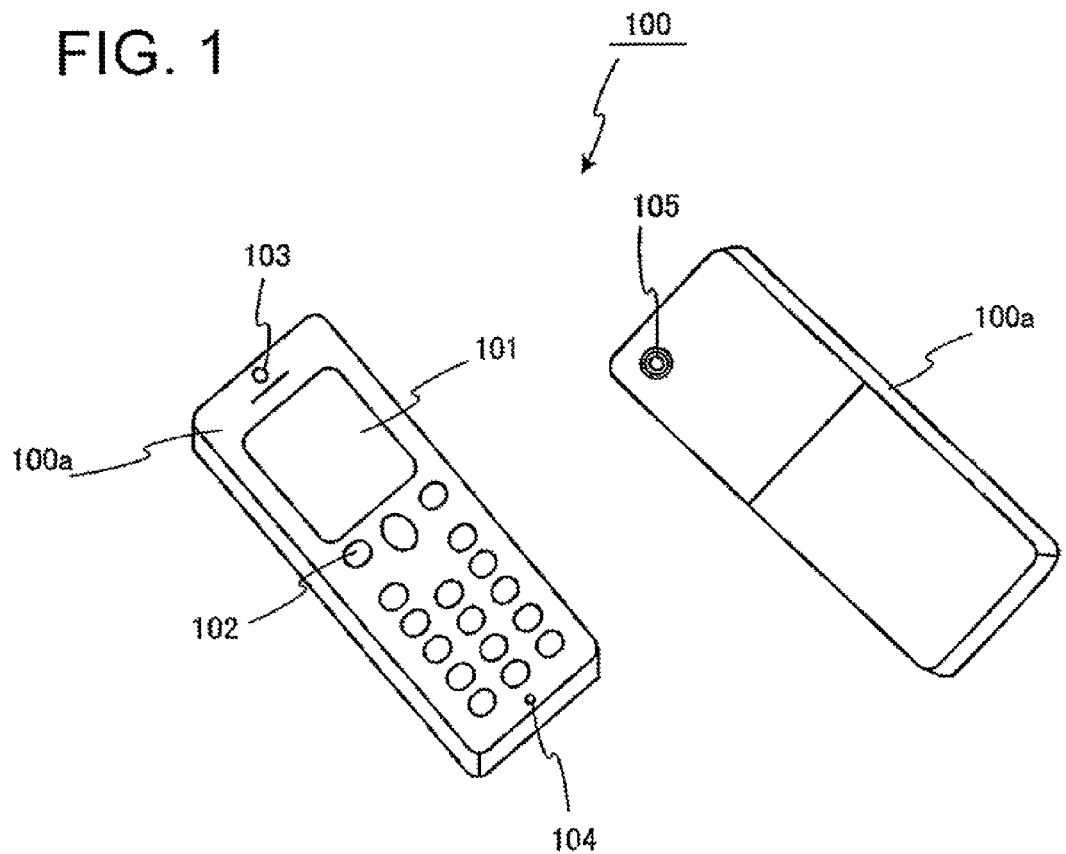
FIG. 1 is a diagram showing the exterior configuration of a mobile phone according to an embodiment of the invention.

An embodiment of the invention will be described with reference to the drawings. In the drawings, the same constituent elements are represented by the same reference numerals, and description will not be repeated.

Embodiment of the Invention

Description of Configuration

An application to a mobile phone terminal as an embodiment of an authentication method for a terminal device, a terminal device, and a program of the invention will be described.

FIG. 1 is a diagram showing the exterior configuration of a mobile phone according to an embodiment of the invention. A mobile phone 100 includes a display section 101, a keyboard 102, a speaker 103, and a microphone 104 at the front surface of a housing, and also includes a camera 105 at the rear surface of the housing. This example shows a configuration example of an integrated housing, but a folder or sliding type housing may be used. The display section 101 can perform menu display, input screen display for inputting a personal identification number or image information as an authentication key, and display of various kinds of information, such as mails or the like, and user data. The speaker 103 and the microphone 104 are used for a telephone call or the like. The camera 105 is partially exposed from a housing 100a of the mobile phone 100 to the outside and used to capture various images, such as still images or motion images including landscapes or facial images.

Figure 2:
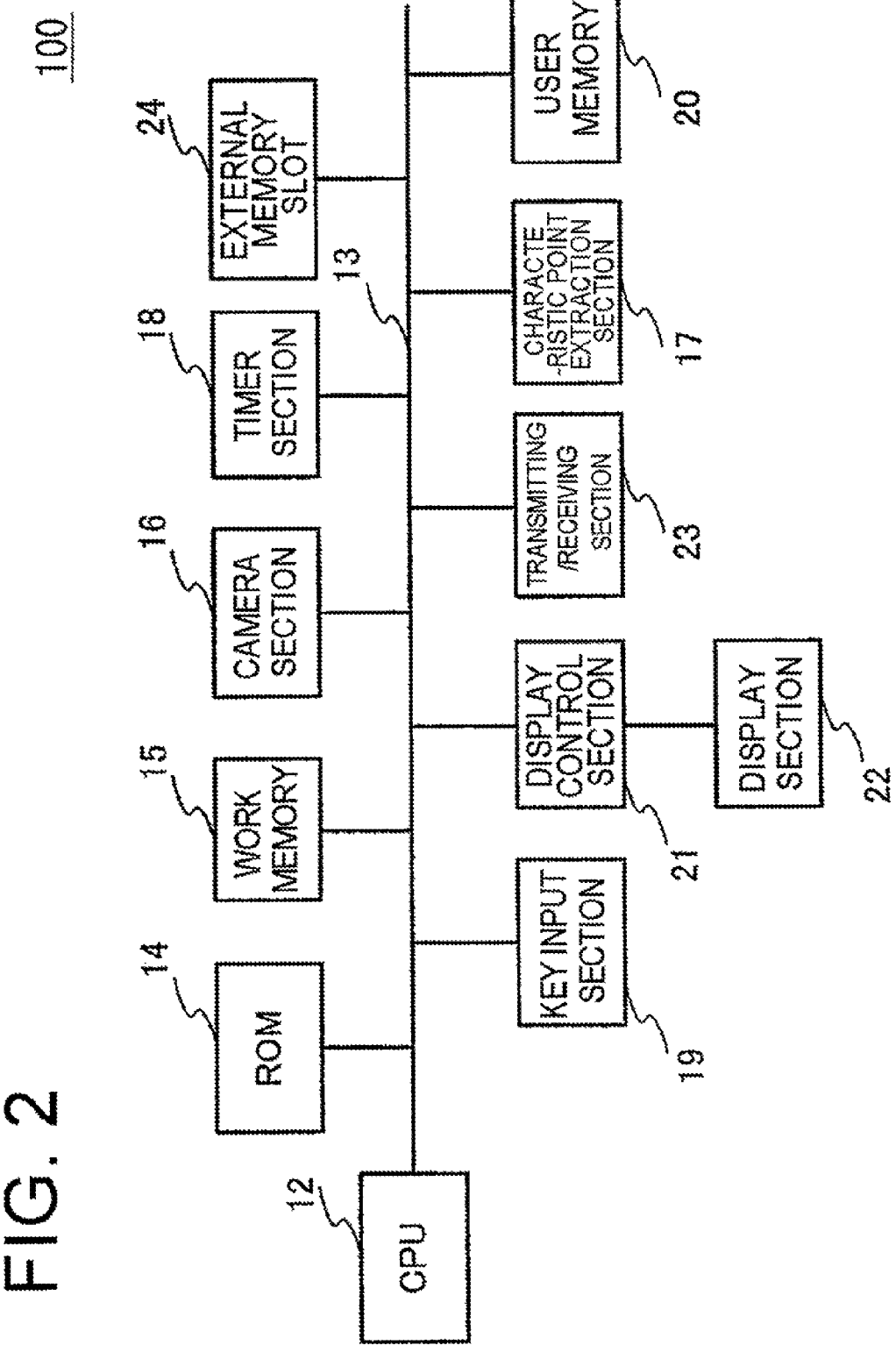
FIG. 2 is a diagram showing main parts of the circuit configuration of the mobile phone of the invention.

FIG. 2 is a diagram showing main parts of the circuit configuration of the mobile phone of the invention. The configuration and functions of respective sections of the mobile phone 100 will be described below. The mobile phone 100 of this embodiment has mounted therein a central processing unit (CPU) 12 constituting a computer serving as a control section. The CPU 12 is connected to the respective sections in the device through a bus 13.

A read only memory (ROM) 14 stores various control programs executed by the CPU 12 or fixed data, such as a dictionary for use in Japanese character conversion or the like. The CPU 12 reads a program stored in the ROM 14, is controlled by the read program, and controls the functions of the respective sections.

A work memory 15 is composed of a random access memory (RAM) and stores data which is temporarily required when the CPU 12 executes a program.

A camera section 16 can read a two-dimensional code, such as a barcode or a QR code, or perform macro photographing for use in handwritten characters, numerals, and figures (handwritten information) recognition. In order to realize two-dimensional code read processing or handwritten information recognition processing, programs for executing the processing may be stored in the ROM 14 or the like, and the relevant program may be executed by the CPU 12. After the handwritten information recognition processing, processing for converting recognized characters into character codes may be executed.

A characteristic point extraction section 17 is an engine that extracts characteristic points from a still image captured by the camera section 16. This engine may be composed of a device by hardware or may be realized by software processing using the CPU 12. The characteristic point extraction section 17 can read a still image attached to a mail, a still image downloaded from a site, and a still image stored in an external memory, as well as the still image captured by the camera section 16, so as to extract characteristic points. A microphone section 18 is a device that is used to manage time (clock) and notifies of an event at a set time.

A key input section 19 is used to input numerals or characters and to select and call (activate) functions, such as data folders or data files, application programs, or the like.

A user memory 20 is a storage section that stores data files created by a user or data files acquired from the outside, such as address book data, still image data, mail data, and the like. The user can add or delete data files with respect to the user memory 20.

A display control section 21 is a control circuit that controls display of a display section 22. The display section 22 is arranged at the front surface of a device main body (not shown), and is a display device, such as a monochrome or color liquid crystal panel, an organic electrofluorescent (EL), or the like.

A transmitting/receiving section 23 is a circuit that performs data transmission/reception in a wireless manner and is mainly used to perform communication with a base station.

An external memory slot 24 is a device that allows an external storage device, such as an SD card, a mini SD, a micro SD, or the like, to be attached/detached to/from the mobile phone 100. The external device can store various data files, such as address book data, still image data, mail data, and motion images. Data can be copied or moved to a memory in the mobile phone 100.

Next, an authentication method of the mobile phone 100 of this embodiment will be described in detail. The authentication method for a terminal device which performs authentication when a security lock is released so as to operate a security-locked function may include comparing a plurality of authentication information used for authentication with a plurality of authentication keys corresponding to a plurality of authentication information input in accordance with a function operation request, and when the authentication is successful, releasing the security lock so as to operate the function. The plurality of authentication information and the plurality of authentication keys may respectively include at least one image.

The user memory 20 or the like of the mobile phone 100 stores various data files, such as an address book, schedule, mails, and captured images. If the data files are not security-locked, a person who acquires the mobile phone 100 can easily read or use data.

This embodiment is not limited to a security lock for the use as a whole, such as at the time of power supply to the mobile phone 100, but a security lock can be provided in units of a function (in units of a target function) relative to the use of data files, data folders, application programs, and the like. That is, a function subject to a security lock may be an application program which can be executed on the terminal device. Further, a function subject to a security lock may be at least one of data folders and data files which can be opened on the terminal device. Specifically, a security lock can be provided for the use in units of a data file or a data folder obtained by collecting individual data, or in units of a mailer, a browser, a scheduler, an application program, such as electronic payment, or the like.

Therefore, the mobile phone 100 of this embodiment requests the user to input knowledge information, such as a personal identification number or a password, or an image as an authentication key at the time of the use of various data files stored in the user memory 20 or the like, or at the time of the use or activation of application programs stored in the user memory 20 or the ROM 14.

For this reason, the user memory 20 or the like stores in advance identification information for identifying the function of a data file, a data folder, an application program, or the like in association with authentication information serving as comparison data which is used in authentication for releasing a security lock. An authentication type (still image, personal identification number, or the like) may be stored in association with the functions and the authentication information.

The authentication key and authentication information may be images stored in the user memory 20. In this case, first characteristic points representing shape characteristics of captured objects on images included in the authentication keys and second characteristic points representing shape characteristics of captured objects on images included in comparison data may be extracted, and the first characteristic points and the second characteristic points may be compared with each other so as to perform authentication. In this case, the same authentication operation can be performed based on images stored in an external storage device, such as an SD card or the like, inserted into the external memory slot 24.

Examples of information with a function, an authentication type, and authentication information associated with each other stored in the user memory 20 in advance will be described with reference to FIGS. 3, 4, and 5.

FIG. 3 is a diagram showing examples of an authentication type and authentication information when a function subject to a security lock is in units of a data folder. With regard to a still image of data folder storage information, an address book, a scheduler, a mail, a motion image, . . . , an authentication type and authentication information are stored in association with each other.

For example, with regard to the use of a data folder of still images, a personal identification number and still image authentication of a user's face are set as an authentication type, and authentication information includes a personal identification number 1234 and a still image 1 of the user's face. With regard to the use of a data folder of an address book, still image authentication of the user's face and authentication of a personal identification number are set as an authentication type, and authentication information includes the same still image 1 and personal identification number 1234. With regard to the use of a data folder of a schedule, still image authentication of a face and still image authentication of an object, such as a personal possession or the like, are set as an authentication type, and authentication information includes the still image 1 and a still image 2. With regard to the use of a data folder of mails, authentication by a personal identification number and still image authentication of a stored image are set as an authentication type, and authentication information includes the personal identification number 1234 and a still image 3. With regard to a motion image, no authentication type and authentication information are set, and no authentication is required for the use of the motion image.

FIG. 4 is a diagram showing examples of an authentication type and authentication information when a function subject to a security lock is a data file. With regard to individual data, that is, first still image data 1, third mail data 3, fifth schedule 5, 21st address book 21, a second motion image 2, . . . of stored information, authentication types are stored in association with authentication information.

For example, with regard to the use of still image data 1, two kinds of still image authentication are set as an authentication type, and authentication information includes a still image 1 and a still image 3. With regard to the use of the schedule 5, still image authentication and authentication by two personal identification numbers are set as an authentication type, and authentication information includes a still image 2, a number 9876, and a number 1234. With regard to the use of the address book 21, a personal identification number and still image authentication are set as an authentication type, and authentication information includes a number 1929 and a still image 5. With regard to the motion image 2, no authentication type and authentication information are set, and no authentication is required for the use.

FIG. 5 is a diagram showing examples of an authentication type and authentication information when a function subject to a security lock is an application program. With regard to a camera, a mailer, a browser, a scheduler, electronic payment, in units of an application function, authentication types are stored in association with authentication information.

For example, with regard to the use of the mailer, authentication by a personal identification number and still image authentication are set as an authentication type, and authentication information includes a number 9876 and a still image 4. With regard to the use of the browser and the scheduler, a combination and an input sequence of two kinds of still image authentication are set as an authentication type, and authentication information includes a still image 3 and a still image 4, and the still image 4 and the still image 3, respectively. With regard to the use of the electronic system, three kinds of still image authentication are set as an authentication type, and authentication information includes a still image 1, a still image 2, and the still image 3. With regard to the camera, no authentication type and authentication information are set, and no authentication is required for the use.

Figure 6:
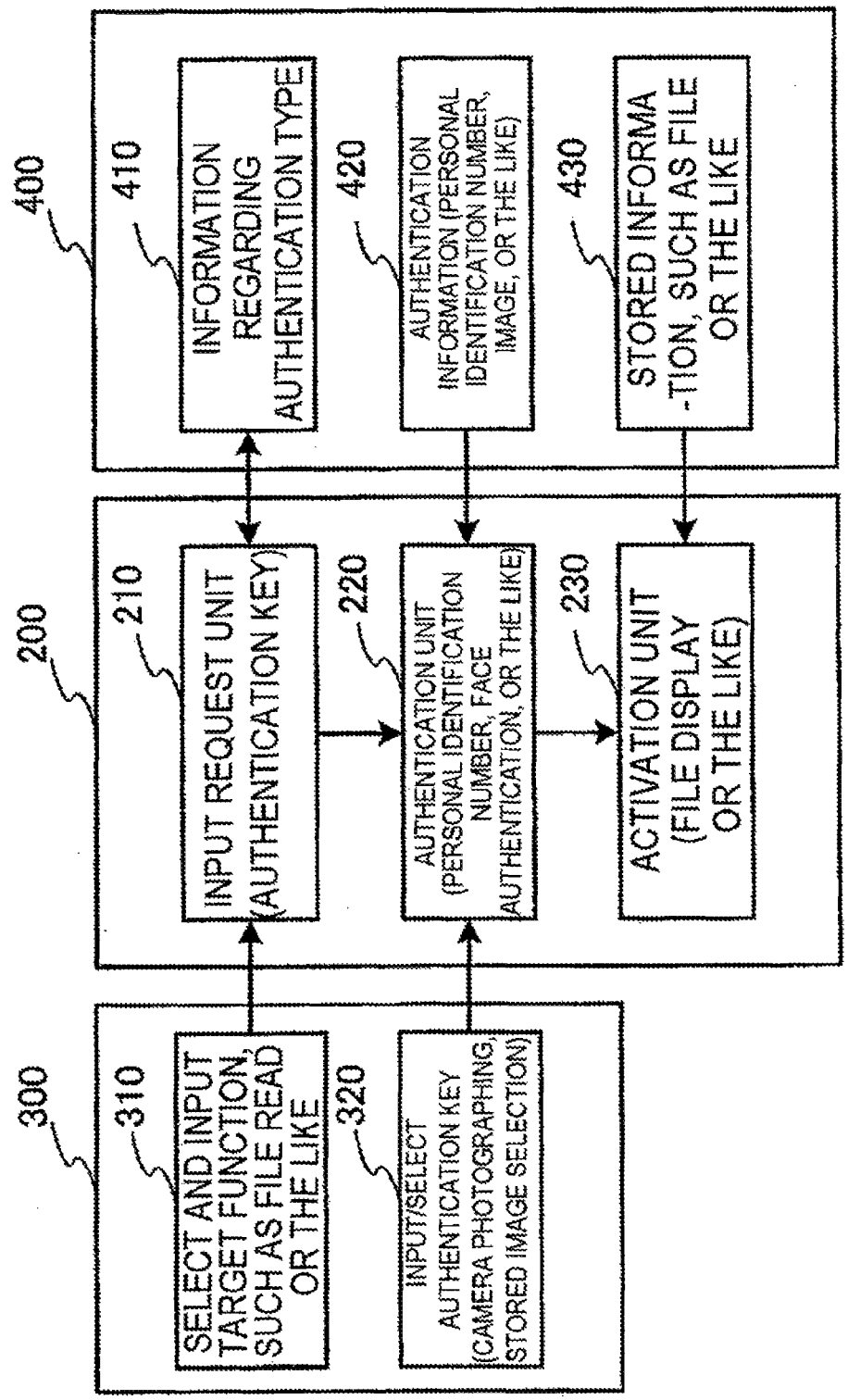
FIG. 6 is a diagram showing a processing function of a mobile phone according to the embodiment of the invention.

FIG. 6 is a diagram showing a processing function of the mobile phone 100 according to the embodiment of the invention. The mobile phone 100 includes a control section 200, an input section 300, and a storage section 400 as the basic configuration of functional units. The CPU 12 of the FIG. 2 forms the control section 200, the key input section 19 or the camera section 16 of FIG. 2 forms the input section 300, and the user memory 20 or the like of FIG. 2 forms the storage section 400.

The mobile phone 100 of this embodiment is a terminal device that performs authentication when a security lock is released so as to operate a security-locked function. The mobile phone 100 may include the storage section 400 storing a plurality of authentication information used for the authentication, an input request section (input request unit) 210 requesting the input of a plurality of authentication keys corresponding to a plurality of authentication information, and an authentication section (authentication unit) 220 comparing the plurality of input authentication keys with the plurality of authentication information so as to perform authentication, and an activation section (activation unit) 230 releasing the security lock so as to operate the function when the authentication is successful. The plurality of authentication information and the plurality of authentication keys may respectively include at least one image.

In the mobile phone 100 of this embodiment, the entire portion or a portion of the configuration may be realized by hardware or may be realized by a computer program (or a program code) for causing the control section 200 (the CPU 12) to execute processing. The control section 200 (the CPU 12) reads the computer program from the storage section 400 (the ROM 14 or the like) and executes the computer program.

The computer program is a program for controlling the terminal device which performs authentication when a security lock is released so as to operate a security-locked function. The computer program may include input request processing for requesting the input of a plurality of authentication keys corresponding to a plurality of authentication information used for authentication in accordance with a function operation request, authentication processing for comparing the plurality of input authentication keys with the plurality of authentication information so as to perform authentication, and activation processing for releasing the security lock so as to operate the function when the authentication is successful. The plurality of authentication information and the plurality of authentication keys may respectively include at least one image.

The control section 200 functions as the input request section 210 which, when the user performs an input operation 310 to select or activate a data folder, a data file, or an application program, determines whether an authentication type is a personal identification number or a still image with reference to information 410 of a corresponding authentication type of the storage section 400, and displays an input request screen for requesting the input of an authentication key on the display section 22. The control section 200 also functions as an authentication section 220 which, when the user inputs a personal identification number in response to the input request or performs an input operation 320 of an authentication key by inputting an image captured by the camera or selecting a stored image, compares the input authentication key with authentication information in terms of characteristic points or the like with reference to corresponding authentication information 420 of the storage section 400. The control section 200 also functions as an activation section 230 which, when the authentication is successful, starts to select or activate a data folder, a data file, or an application program on the basis of stored information 430. These functions are realized by a control program read from the ROM 14 by the CPU 12.

(Description of Operation)

The operation of the embodiment of the authentication method, the terminal device, and the program according to the invention will be described.

Figure 7:
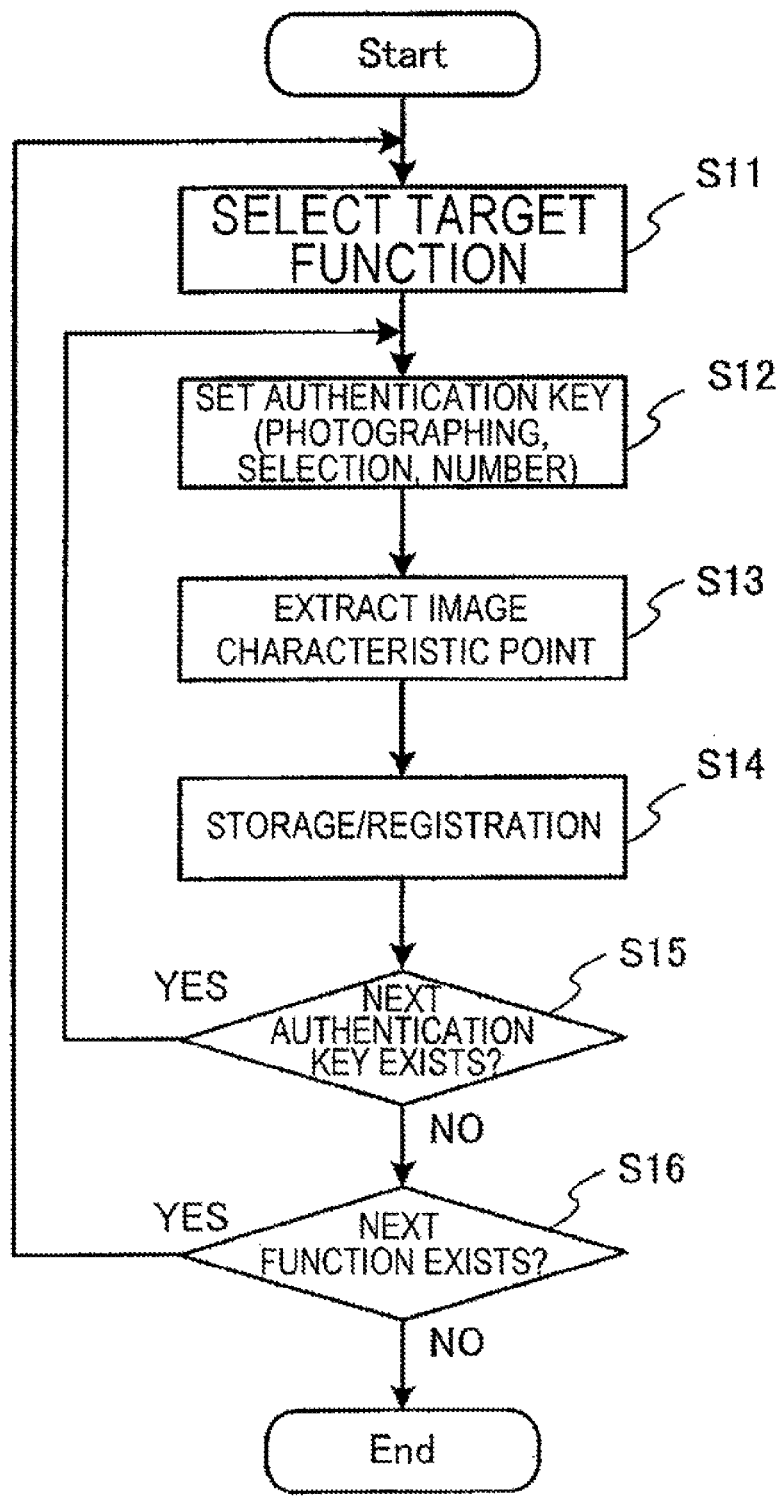
FIG. 7 is a diagram showing a processing example of setting authentication information and authentication keys relative to a plurality of functions of the mobile phone.

First, processing for setting a security lock in units of a function according to this embodiment will be described. FIG. 7 is a diagram showing a processing example for setting authentication information and authentication keys for a plurality of functions of the mobile phone 100. In setting of authentication information and authentication keys for the functions of the mobile phone 100, first, if an initial target function is selected (Step S11), and the user's face is photographed by the internal camera, a stored image is selected, or a personal identification number is input as authentication information and an authentication key (Step S12), the CPU 12 of the mobile phone 100 transfers the captured image or the stored image to the characteristic point extraction section 17 so as to extract a characteristic point (Step S13), and stores the extracted characteristic point, the personal identification number, and the like as authentication information in the user memory 20, together with the authentication type (Step S14). Next, it is determined whether or not subsequent setting of authentication information and authentication exists with respect to the initial target function, and if subsequent authentication information and authentication key exist (YES in Step S15), the process returns to Step S12, and the same setting processing is repeated (Steps S12 to S15). If no subsequent setting of authentication information and authentication key exists (NO in Step S15), when there is a target function for which additional authentication information and an authentication key are set (YES in Step S16), the process returns to Step S11, and the above-described setting processing is repeated in the same manner (Steps S11 to S16). If there is no target function for which additional authentication information and an authentication key are set (NO in Step S16), the setting of the security lock ends.

Next, an authentication operation of this embodiment will be described.

Figure 8:
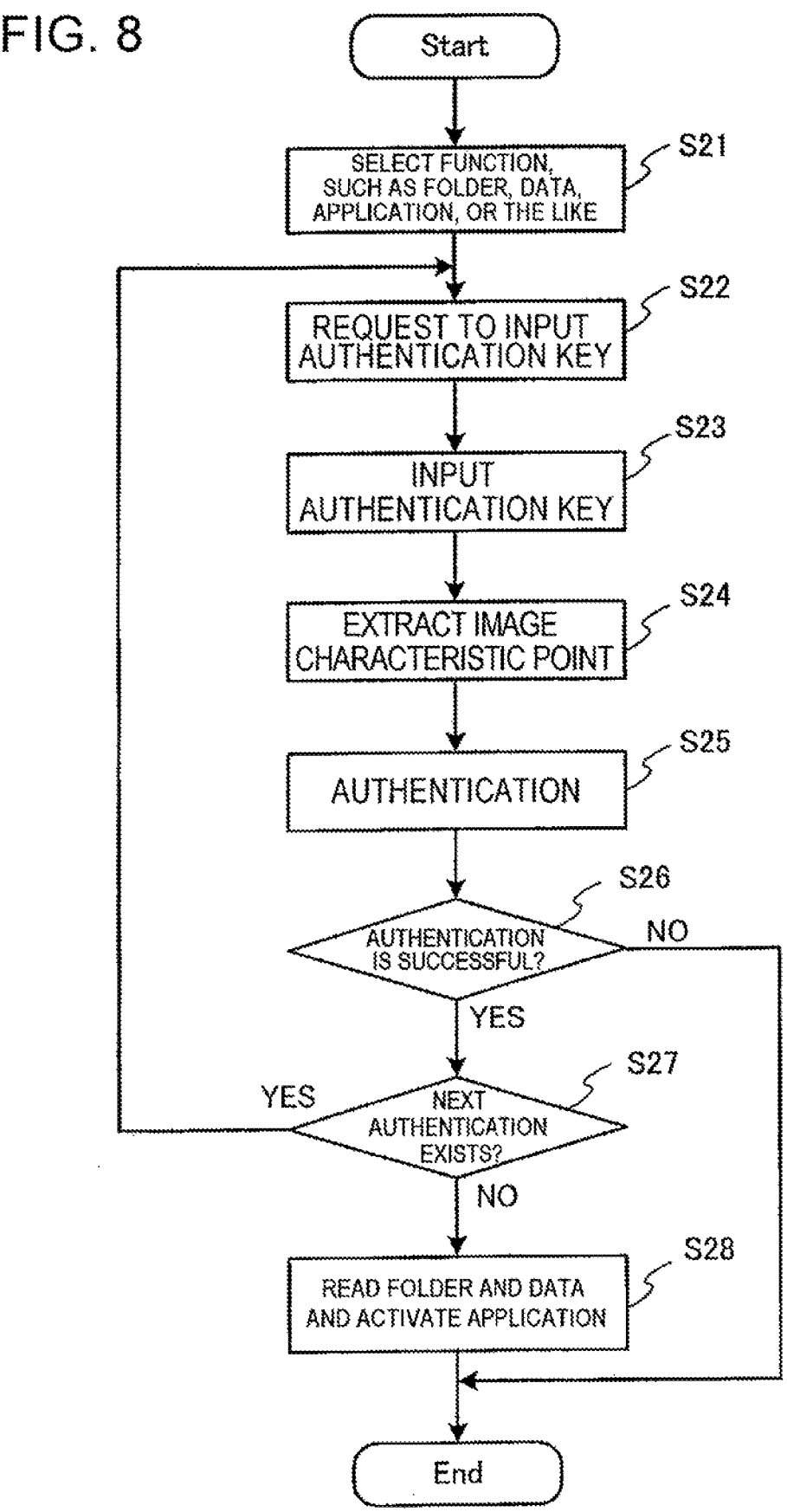
FIG. 8 is a diagram showing a processing example of authentication operations based on different authentication information and authentication keys between functions of the mobile phone.

FIG. 8 is a diagram showing a processing example of an authentication operation based on different authentication information and authentication keys between the functions of the mobile phone 100. If the user selects any one function of security-locked data folders, data files, application programs, and the like of the mobile phone 100 (Step S21), the control section 200 requests the input of an authentication key and displays the input request on the display section 22 (Step S22). For example, if the user photographs his/her face (an object to be captured) by the camera section 16 (an internal camera of the terminal device) (Step S23), the control section 200 performs authentication processing for extracting the characteristic point of the image by the characteristic point extraction section 17 (Step S24), and comparing the characteristic point with the characteristic point of the same still image stored as authentication information read from the storage section 400 in advance (Step S25). If the authentication is successful (YES in Step S26), it is determined whether or not next authentication exists with respect to the relevant selected function, and when next authentication is required (YES in Step S27), the process returns to Step S22, and the same processing as described above is repeated (Steps S23 to S27). If all kinds of authentication set in advance are successful (No in Step S27), the control section 200 operates the relevant function, for example, allows reading of the selected data folder or data file, or activates or ends the application program (Step S28).

In the authentication processing described above, when the authentication has failed once (NO in Step S26), the control section 200 rejects the operation of the relevant function and displays an indication on the display section 22 or the like. When the authentication has failed (NO in Step S26), the process may return to Step S22, the user may be requested to input the authentication key again, and when the authentication has failed a predetermined number of times in the same input, the operation of the relevant function may be rejected.

Although in the above description, an example where an image captured by the internal camera is input as an authentication key, as shown in FIGS. 3, 4, and 5, a personal identification number may be input or a stored image may be selected through the key input section 19.

In this case, it is preferable that, when requesting the user to input an authentication key in accordance with a function selected by the user with reference to information of the storage section 400 (Step S22), the control section 200 can perform processing for displaying an input screen of a personal identification number on the display section 22 or for requesting the user to select a stored image, and when inputting an authentication key (Step S23), the user can input a personal identification number or select a stored image through the input section 300.

As described above, according to this embodiment, a plurality of authentication information and a plurality of authentication keys may include an image, or a combination of an image and knowledge information including at least one of a personal identification number and a password, and a plurality of images. Therefore, if authentication priority or the like is set, security can be suitably set for each function with different strength.

In this embodiment, the characteristic points are extracted and used for authentication processing based on still images, so it is possible to reduce authentication information and also to limit the allowable range at the time of authentication. For this reason, it is possible to achieve high security using a still image itself while reducing the amount of data to be stored, suppressing the memory usage, and suppressing a processing burden.

Other Embodiments of the Invention

In the description about the operation of the mobile phone 100, with regard to an object to be captured, all of photographable objects can be used as authentication information, and a captured object on an image includes at least one of a biological object, a two-dimensional code, and handwritten information. For example, a biological object, such as fingerprint, digital vein, retina, or the like, an object that the user carries everyday, for example, a ball pen, a pass, a license, or the like, may be used as an object to be photographed. Further, handwritten information may be used as an object to be photographed.

Figure 9A:
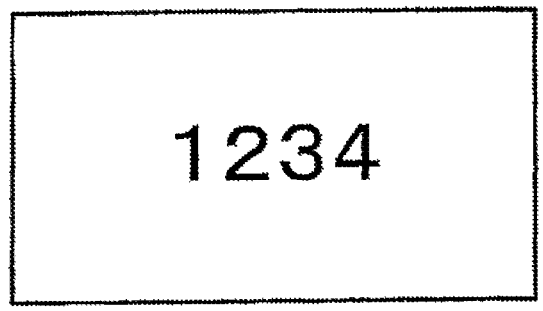
FIG. 9 is a diagram showing an example where handwritten information is read and input as an authentication key.
Figure 9B:
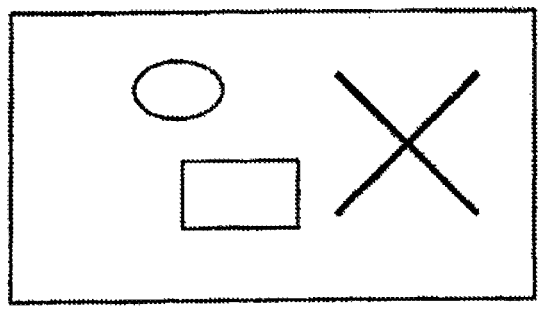
Figure 9C:
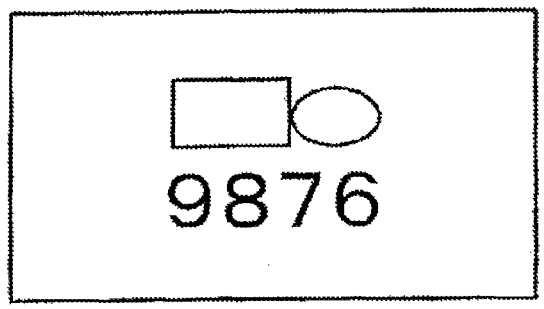

FIG. 9 is a diagram showing an example where handwritten information is read and input as an authentication key. As shown in FIG. 9(a) to (c), a card on which a signature or a figure is written may be used, in addition to handwritten characters or numerals. The user carries this card as a security card, photographs the card at the time of authentication, and combines handwriting or figures so as to release security. Further, if a film or the like is used, color information may also be used for authentication. As described above, if the mobile phone 100 can recognize handwritten information by using the camera section 16 and convert the recognized characters into character codes, knowledge authentication can be performed with the character codes as an authentication key. In addition, if the mobile phone 100 can read a two-dimensional code, such as a barcode or a QR code, by using the camera section 16 and convert the read two-dimensional code into an information code, knowledge authentication can be performed with the information code as an authentication key.

As the still image, a photographed image stored inside or outside the mobile phone 100 may be selected and used. For example, an image acquired from an external storage device (an external memory, such as an SD, mini SD, or micro SD card) connected to the external memory slot 24 may be input as an authentication key. Therefore, a still image stored in the external memory in advance can be used for authentication.

In addition to the still image captured by the camera, an image received through a communication network which is connected through the transmitting/receiving section 23, for example, an image downloaded from a mail or a Web site may be input as an authentication key. Therefore, at the time of the authentication operation, an image for authentication can be acquired through connection to an external server.

Security can be provided such that data can be read only at a specific place. For example, a photographed image for authentication may be provided in a data storage room of a company, and only a person who enters that place may capture an image by a camera and use the functions of the mobile phone 110, for example, read secret data or the like. Therefore, double security of entrance check and image authentication can be provided. That is, with regard to information which can be read only at a specific place, a specific subject is provided at that place such that the user can photograph the subject and read information.

As described above, in this embodiment, personal identification numbers, still images, and the like are combined for each target function of the mobile phone 100, so while a security function is added with minimum storage of set authentication keys, locking is provided with security at a required level. Therefore, it is possible to significantly increase an insufficient security function at the time of locking of the terminal device as a whole.

The invention is not limited to a mobile phone, and may also be applied to a terminal device, such as a PDA, a personal computer, an ATM at bank, a CD, or the like, containing personal information.

This application is the National Phase of PCT/JP2008/002417, filed Sep. 3, 2008, which claims priority based on Japanese Patent Application No. 2007-234320 filed on Sep. 10, 2007, the disclosure of which is incorporated herein by reference.

The invention claimed is:

1. An authentication method for a mobile device which performs authentication when a security lock is released so as to operate a security-locked function, the authentication method comprising:
receiving a function operation request to execute one of functions of the mobile device;
comparing a plurality of authentication information used for said authentication with a plurality of authentication keys input in accordance with the function operation request to perform authentication,
releasing said security lock to operate said one function, when the authentication is successful;
receiving a new function operation request to execute another one of the functions of the mobile device; and
repeating the comparing and the releasing, to match the plurality of authentication information with the plurality of authentication keys input in accordance with the new function operation request, to release and operate the another function when the authentication is successful for the new function operation request,
wherein said plurality of authentication information and said plurality of authentication keys respectively include at least one image of a specific object set at a specific place which is taken by the mobile device,
the specific place is a place which only a person who passed an entrance check can enter,
the functions comprise at least one of a data folder which is openable on the mobile device, and a data file which is openable on the mobile device, and
the comparing and the releasing are performed by a computer.

2. The authentication method as set forth in claim 1, wherein a captured object on said image includes at least one of a biological object, a two-dimensional code, and handwritten information.

3. The authentication method as set forth in claim 1, wherein first characteristic points representing shape characteristics of captured objects on images included in said authentication keys and second characteristic points representing shape characteristics of captured objects on images included in said authentication information are extracted, and
said first characteristic points and said second characteristic points are compared with each other so as to perform authentication.

4. The authentication method as set forth in claim 1, wherein said plurality of authentication information and said plurality of authentication keys respectively include a combination of an image and knowledge information including at least one of a personal identification number and a password, and a plurality of images.

5. The authentication method as set forth in claim 1, wherein identification information for identifying said function is stored in association with said authentication information.

6. The authentication method as set forth in claim 1, wherein said functions further comprise an application program which is executable on said mobile device.

7. The authentication method as set forth in claim 1, wherein images acquired by photographing objects to be captured using an internal camera of said mobile device are input as said authentication keys.

8. The authentication method as set forth in claim 1, wherein images received through a communication network to which said mobile device is connected are input as said authentication keys.

9. The authentication method as set forth in claim 1, wherein images acquired from an external storage device to which said mobile device is connected are input as said authentication keys.

10. The authentication method as set forth in claim 1, wherein the plurality of authentication information comprises identification items and the method further comprises:
   prior to the requesting, associating different functions of the mobile device with corresponding sets of the identification items; and
   storing each of the sets in association with each of the different functions.

11. The authentication method as set forth in claim 10, wherein each of the sets comprises a combination of the identification items different from that of other sets.

12. The authentication method as set forth in claim 1, wherein the another function is different from the one function.

13. A mobile device that performs authentication when a security lock is released so as to operate a security-locked function, the mobile device comprising:
   a storage unit configured to store a plurality of authentication information used for said authentication;
   an input request unit configured to request an input of a plurality of authentication keys corresponding to said plurality of authentication information in accordance with a received function operation request to execute one of functions of the mobile device;
   an authentication unit configured to compare said plurality of input authentication keys with said plurality of authentication information to perform authentication; and
   an activation unit configured to release said security lock to operate said one function when said authentication is successful,
   wherein said plurality of authentication information and said plurality of authentication keys respectively include at least one image of a specific object set at a specific place which is taken by the mobile device,
   the specific place is a place which only a person who passed an entrance check can enter, and
   the functions comprise at least one of a data folder which is openable on the mobile device, and a data file which is openable on the mobile device, and
   wherein:
   when a new function operation request is received to execute another one of the functions of the mobile device, the authentication unit is further configured to compare the plurality of authentication information with the plurality of authentication keys input in accordance with the new function operation request to perform authentication, and
   the activation unit is further configured to release the security lock to operate the another function, when the authentication is successful for the new function operation request.

14. The mobile device as set forth in claim 13, wherein a captured object on said image includes at least one of a biological object, a two-dimensional code, and handwritten information.

15. The mobile device as set forth in claim 13, further comprising:
   a characteristic point extraction unit configured to extract first characteristic points representing shape characteristics of captured objects on images included in said authentication keys and second characteristic points representing shape characteristics of captured objects on images included in said authentication information,
   wherein said authentication unit compares said first characteristic points and said second characteristic points so as to perform authentication.

16. The mobile device as set forth in claim 13, wherein said plurality of authentication information and said plurality of authentication keys respectively include a combination of an image and knowledge information including at least one of a personal identification number and a password, and a plurality of images.

17. The mobile device as set forth in claim 13, wherein said storage unit stores identification information for identifying said function in association with said authentication information.

18. A non-transitory computer readable storage medium storing software program which, when executed by a computer, causes the computer to perform a method for controlling a mobile device which performs authentication when a security lock is released so as to operate a security-locked function, the method comprising:
   receiving a function operation request to execute one of functions of the mobile device;
   requesting an input of a plurality of authentication keys corresponding to a plurality of authentication information used for said authentication in accordance with the function operation request;
   comparing said plurality of input authentication keys with said plurality of authentication information to perform authentication;
   releasing said security lock to operate said one function when the authentication is successful;
   receiving a new function operation request to execute another one of the functions of the mobile device; and
   repeating the requesting, the comparing and the releasing, to match the plurality of authentication information with the plurality of authentication keys input in accordance with the new function operation request, to release and operate the another function when the authentication is successful for the new function operation request,
   wherein said plurality of authentication information and said plurality of authentication keys respectively include at least one image of a specific object set at a specific place which is taken by the mobile device,
   the specific place is a place which only a person who passed an entrance check can enter, and
   the functions comprise at least one of a data folder which is openable on the mobile device, and a data file which is openable on the mobile device.

19. The non-transitory computer readable storage medium as set forth in claim 18, wherein a captured object on said image includes at least one of a biological object, a two-dimensional code, and handwritten information.

20. The non-transitory computer readable storage medium as set forth in claim 18, wherein the method further comprises:
   extracting first characteristic points representing shape characteristics of captured objects on images included in said authentication keys and second characteristic points representing shape characteristics of captured objects on images included in said authentication information,
   wherein, in said performing authentication, said first characteristic points and said second characteristic points are compared with each other so as to perform authentication.

21. The non-transitory computer readable storage medium as set forth in claim 18, wherein said plurality of authentication information and said plurality of authentication keys respectively include a combination of an image and knowledge information including at least one of a personal identification number and a password, and a plurality of images.

22. The non-transitory computer readable storage medium as set forth in claim 18, wherein said storage unit stores identification information for identifying said function in association with said authentication information.

* * * * *